US011438202B2

(12) United States Patent
Courtat

(10) Patent No.: US 11,438,202 B2
(45) Date of Patent: Sep. 6, 2022

(54) SYSTEM FOR DEMODULATING OR FOR BLIND SEARCHING THE CHARACTERISTICS OF DIGITAL TELECOMMUNICATION SIGNALS

(71) Applicant: Avantix, Aix-en-Provence (FR)

(72) Inventor: Thomas Courtat, Paris (FR)

(73) Assignee: AVANTIX, Aix-en-Provence (FR)

( * ) Notice: Subject to any disclaimer, the term of this patent is extended or adjusted under 35 U.S.C. 154(b) by 179 days.

(21) Appl. No.: 16/958,779

(22) PCT Filed: Dec. 28, 2018

(86) PCT No.: PCT/FR2018/053559
§ 371 (c)(1),
(2) Date: Jun. 29, 2020

(87) PCT Pub. No.: WO2019/130002
PCT Pub. Date: Jul. 4, 2019

(65) Prior Publication Data

US 2020/0328922 A1 Oct. 15, 2020

(30) Foreign Application Priority Data

Dec. 29, 2017 (FR) ...................................... 1701417

(51) Int. Cl.
*H04B 1/10* (2006.01)
*H04L 27/233* (2006.01)
(Continued)

(52) U.S. Cl.
CPC ......... *H04L 27/2331* (2013.01); *G06N 3/084* (2013.01); *H04L 25/03331* (2013.01); *H04L 27/0012* (2013.01); *H04L 27/0014* (2013.01)

(58) Field of Classification Search
CPC ........... H04L 27/2331; H04L 25/03331; H04L 27/0012; H04L 27/0014; G06N 3/084
(Continued)

(56) References Cited

U.S. PATENT DOCUMENTS 5,517,598 A 5/1996 Sirat
7,194,047 B2 * 3/2007 Strolle ................. H04L 1/0065 714/795

(Continued)

FOREIGN PATENT DOCUMENTS

EP 0 372 613 A1 6/1990
FR 3 030 964 A1 6/2016

OTHER PUBLICATIONS

Treichler, J.R. et al., "Practical implementations of blind demodulators," Signals, Systems and Computers 1997, Conference Record of the Thirty-First Asilomar Conference, dated Nov. 2-5, 1997, Publisher: IEEE, DOI: 10.1109/ACSSC.1997.679062, pp. 1028-1032.

(Continued)

*Primary Examiner* — Don N Vo
(74) *Attorney, Agent, or Firm* — Arc IP Law, PC; Joseph J. Mayo

(57) ABSTRACT

The present invention relates to a system for demodulating or blind searching the characteristics of digital telecommunication signals, characterized in that it comprises at least one hardware architecture or hardware and firmware comprising memories and one or more processing units for implementing a network of specific computation blocks connected together, including

Figure 1:
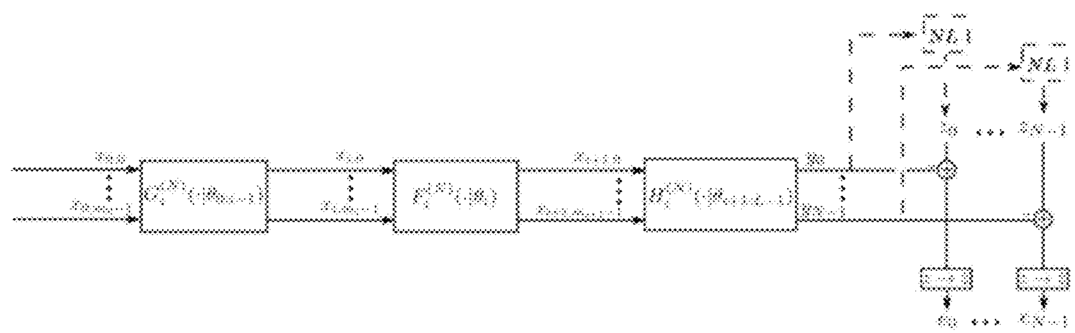

- a first specialized block of the network estimating at least one filter for acquiring the blind signal, and
- a second block subsequently producing at least one module for estimating the amplification of the observed signals in order to subsequently assess the other char- (Continued)

acteristics of the signals observed by the other computation blocks of the network, at least a third specialized computation block producing a decision-making module for computing an error signal and back-propagating the computed errors to each of the preceding residual blocks ("propagate", "update").

19 Claims, 3 Drawing Sheets

(51) Int. Cl.
*G06N 3/08* (2006.01)
*H04L 25/03* (2006.01)
*H04L 27/00* (2006.01)

(58) Field of Classification Search
USPC .................................................. 375/232, 350
See application file for complete search history.

(56) References Cited

U.S. PATENT DOCUMENTS 8,605,828 B2 12/2013 Chaudhary et al.
9,673,910 B1 * 6/2017 Crivelli .............. H04B 10/6161
2013/0216005 A1 8/2013 Chaudhary et al.
2014/0086299 A1 * 3/2014 Pustovalov ....... H04L 25/03159 375/232
2015/0270921 A1 * 9/2015 Jia ......................... H04L 1/0054 398/25

OTHER PUBLICATIONS

Treichler, J.R. et al., "Practical Blind Demodulators for High-Order QAM Signals," Proceedings of the IEEE, vol. 86, No. 10, published on Oct. 1, 1998, pp. 1907-1926.
International Search Report of the International Searching Authority for PCT/FR2018/053559 dated Apr. 5, 2019.
English translation of International Search Report of the International Searching Authority for PCT/FR2018/053559 dated Apr. 5, 2019.

* cited by examiner

SYSTEM FOR DEMODULATING OR FOR BLIND SEARCHING THE CHARACTERISTICS OF DIGITAL TELECOMMUNICATION SIGNALS

TECHNICAL FIELD OF THE INVENTION

This invention generally relates to a system for processing digital telecommunication signals, and in particular a system for the possible blind searching of the characteristics of mono-polarized, bipolarized or multipolarized telecommunication signals.

TECHNOLOGICAL BACKGROUND OF THE INVENTION

In digital telecommunications, a transmitter seeks to transmit a sequence of information bits to one (or more) receiver(s). The transmitter performs a series of coding operations in order to enable the transmission of the information on a physical medium which is also called a propagation channel (such as an optical fiber, or as is more particularly the case here, by unconstrained propagation in space). This propagation channel is generally not perfect in the sense that the received signal is not an exact replica of the transmitted signal (thermal disturbances, reverberations, dispersion). At the transmitter, a constellation is given ("Amplitude-shift keying", or ASK, is a form of amplitude modulation which represents digital data as variations in the amplitude of a carrier wave; "Phase-shift keying", or M-PSK, designates a family of digital modulation forms which all have the principle of conveying binary information via the phase of a reference signal; "Quadrature amplitude modulation", or M-QAM, is both a digital and an analog scheme that transmits two analog message signals or two digital bit streams, modifying/modulating the amplitudes of two carrier waves, using the ASK modulation scheme or the analog modulation model) which is a finite set of symbols in the complex plane and a function that has a defined number of consecutive bits associating a symbol of the constellation. Each symbol in the sequence is multiplied by a continuous waveform (or shaping filter), time-shifted to form the baseband signal. This baseband signal is transposed at a certain frequency, called the carrier frequency, and then transmitted by a radio interface (an antenna in the case of a wireless transmission). On reception, the reverse operations are performed to reconstruct the information bits from the signal measured on the radio interface. In particular, demodulation is the operation that identifies on reception the symbols actually transmitted by the transmitter from the received signal.

Blind demodulation is referred to when one of the transmission parameters is unknown to the transmitter. In cooperative telecommunications, most parameters are defined by contract between the transmitter and the receiver (carrier frequency, constellation type, time lag between waveforms, transmit power). The only remaining unknowns are possible synchronization errors and the effect of the propagation channel. These parameters are generally estimated by regular transmission of sequences, referred to as pilots, known to both parties. The operation compensating the effects of the channel before demodulation is called equalization.

In non-cooperative telecommunications, on the other hand, all the parameters are unknown, or only known as an order of magnitude, and there are no pilot sequences to facilitate equalization.

One of the goals of patent FR3030964 is to propose methods for blind-separating and demodulating two digitally stable digital signals using an expectation maximization algorithm. However, such a method is still too demanding in terms of computing time to be able to follow a signal in real time. Moreover, this document applies only to a single channel.

U.S. Pat. No. 8,605,828 proposes a blind mechanism for demodulating offset QPSK signals in the presence of a carrier phase error.

Said document teaches a mechanism for blind demodulation of a specific telecommunication signal for estimating and correcting the carrier phase offset. However, the method does not allow a correction of several parameters nor a structure allowing same.

GENERAL DESCRIPTION OF THE INVENTION

The aim of this invention is to overcome certain disadvantages of the prior art by proposing a system for optimizing and facilitating searching, possibly blindly, for the characteristics of mono-polarized, bipolarized or multipolarized telecommunication signals allowing real-time implementation.

For this purpose, this invention relates to a system for demodulating or for blind searching the characteristics of digital telecommunication signals, based on the observation by sampling of a signal comprising parameters comprising, in particular, the equalization coefficients, the value of the phase ((p), the amplitude of the signal, their frequency and their symbol time, characterized in that it comprises at least one hardware architecture or hardware and firmware comprising memories and one or more processing units for implementing a network of specific computation blocks connected to each other, of which:

- a first specialized block of the network performs the estimation of at least one filter for blind signal acquisition, and
- then a second block implements at least one module making it possible to estimate the amplification of the observed signals in order to subsequently evaluate the other characteristics of the signals observed by the other computation blocks of the network,
- at least a third specialized computation block implements a decision module to calculate an error signal and back-propagate the computed errors to each of the previous residual ("propagate", "update") blocks.

According to another particular feature, the system comprises an additional specialized block connected to the outputs of the second block and to the inputs of the decision block, this additional block implementing at least one frequency estimation module for determining the frequencies of the blind-transmitted signals and/or at least one phase module for determining the phase values of said signals.

According to a further particular feature, the phase module can be arranged in an additional computation block connected to the outputs of the frequency computation block of the additional block.

According to a further particular feature, upon initialization of the system, parameters $\theta_i$ are provided by default by a system memory, allowing in the first instants, known as convergence phase, the convergence of the $\theta_i$ on the relevant values; then, when the system reaches a defined vicinity of the $\theta_i$ parameters, the system enters a so-called production or monitoring phase, wherein the distances between the calculated values and those stored and defining a vicinity are less than certain pre-stored thresholds, the outputs of the demodulator system are then reliable and usable to apply them to a user device or to other hardware or software or firmware elements making it possible to finalize the demodulation.

According to another particular feature, each of the processing blocks N0 of at least one of the two channels receives each of the two input signals $x^h{}_0$, $x^v{}_0$ representing respectively a sampling of each channel, to generate the output signals $x^v{}_1$ and $x^h{}_1$, the signals $x_3{}^h$ and $x_3{}^v$ being representative of a correction applied to each signal $x_0$ by the respective output signals $x_2{}^v$, $x_2{}^h$, of each of the filters G of each channel, each emulated by a processing block N2, the signals $x_3{}^h$ and $x_3{}^v$ are sent to the serial cascades of the processing blocks N3, N4 and N5 of each channel, each emulating the signal indicating the amplification of the channel (ampli), for block N3, respectively the frequency (fq) of the channel for block N4 and respectively the phase (φ) of the channel for block N5.

According to another particular feature, each respective output $y^h$, $y^v$ of each processing block N5 emulating the phase of each channel H and V, is sent to each decision block N6 of each channel and to each of the respective inputs of the back-propagation circuit of at least two errors ($e^h$ and $e^v$) through the "mirror" blocks which allow on-the-fly calculation of the increments of the different parameters of the blocks of the chain, the system comprising several processing modules of a plurality of observations of each input signal ($x_i$), each associated with an "Update" mirror or residual block for each phase, frequency, amplification parameter and a corresponding "Propagate" mirror or residual block for each phase, frequency, amplification parameter.

According to another particular feature, the output $Z^h$, $Z^v$ of each decision block is also sent to a pair of multipliers ($M_1{}^h$, $M_2{}^h$, $M_1{}^v$, $M_2{}^v$), receiving respectively one from the phase block and the other from the frequency block fq. The output of the last multiplier $M_2{}^i$ of each channel is sent to each of the filters G of each channel, each emulated by a processing block ($N_2{}^h$, $N_2{}^v$) of each channel.

According to a variant, the invention relates to a real-time method of blind demodulation of digital telecommunication signals, based on the observation of a sampled version of this signal A single-channel signal is defined as a linearly-modulated digital signal transmitted by frequency transposition over a finite bandwidth. A dual-channel signal is defined as a pair of single-channel signals multiplexed over two orthogonal polarizations.

The method applied in a certain scheme makes it possible in particular to demodulate a single-channel signal of linear modulation by compensating: the amplification of the signal, its phase, its carrier leak, the effects of the propagation channel.

The method applied according to another scheme makes it possible in particular to demodulate a dual-channel signal and to separate the two components thereof by compensating: the amplification of the signals, their phases, the carrier leaks, the effects of the propagation channel and the effects of the propagation co-channel (leak from one polarization to the other and vice-versa during the propagation of the signal).

The method herein described may be considered, in general terms, as a sequence of MIMO blocks (multi inputs, multi outputs) called "specialized neurons", each block (i) performing an elementary processing parameterized by a set $\theta_i$. If all the $\theta_i$ of the chain are correctly set, the chain proceeds to the effective demodulation of the signal. If the \theta_i are unknown, the chain enables the in-line learning of the relevant values for each $\theta_i$. When the system is initialized, $\theta_i$ are provided by default by a memory. In the first moments, the system enables the convergence of the parameters $\theta_i$ on relevant values; this phase is called the convergence phase; the demodulated signal produced at the output is thus not reliable. When the system reaches the vicinity of the parameters $\theta_i$, the process enters the production or monitoring phase. That is to say that the distances between the calculated values and those stored in the system implementing the method and defining a vicinity are lower than certain pre-memorized thresholds. The outputs of the demodulator are then reliable and usable. When the system reaches the vicinity of the parameters $\theta_i$, the process enters the production or monitoring phase.

The outputs of the demodulator are then reliable and, together with the demodulation of the signal, the system continues with the variation of the parameters of the system. The system does not explicitly switch from one mode to the other, the second phase is a continuation of the first.

The method of the invention may comprise the following steps:

- acquisition by a sampling of a first plurality of the signal in order to each constitute an input of a network of L processing blocks, also referred to here as "specialized neurons", each neuron being simulated by the outputs of the preceding block, the first plurality of the signal being input to the first block simulating a first neuron of the network in order to generate a plurality of outputs of the first block; each neuron $F_i$ being simulated by the outputs of an upstream chain $G_j$ and stimulating a downstream chain $H_i$; each set of samples passes through the same processing chain;
- the outputs of the last blocks of the network ideally correspond to the demodulated symbols;
- addition of a nonlinearity to each of the outputs of the last block of the network making it possible to calculate an error signal and propagation of this error in the reverse direction of the processing chain ("back-propagation");
- estimation, upon receipt of the error by each neuron (i), of a corrective term $\delta\theta_i$ and updating, in each block, of the value of the parameter $\theta_i$ according to $\theta_i += \delta\theta_i$.

According to another particular feature, each neuron in the network specifically performs:

- a processing of a "Next" function, implemented and executed in a processing logic sub-block ($F_i^{(N)}$), to generate outputs from a plurality of signal observations and transmit them to the processing block of the next neuron of the network; this function is generally written as $(x_{i+1,0}, \ldots, x_{i+1,m_{i+1}-1}) = \text{next}(x_{i,0}, \ldots, x_{i,m_i-1})$ with $m_i$ being the number of inputs and $m_{i+1}$ being the number of outputs of $F_i^{(N)}$ which corresponds to the number of inputs of $F_{i+1}^{(N)}$,
- a processing of a "Propagate" function, implemented and executed in a "Propagate" logic sub-block ($F_i^{(P)}$) in order to calculate errors $(e_{i+1,0}, \ldots, e_{i+1,m_{i+1}-1})$ provided by the block $F_{i+1}^{(P)}$ or by $(e_{L-1,0}, \ldots e_{L-1,N-1}) = (e_0, \ldots, e_{N-1})$ with $e_j = z_J - y_J$ at the chain end, i.e. at the input $F_{L-1}^{(P)}$; for the $i^{th}$ neuron, this function is generally written in the form $(e_{i,0}, \ldots, e_{i,m_i-1}) = \text{propagate}(e_{i+1,0}, \ldots, e_{i+1,m_{i+1}-1})$
- a processing of an "Update" function, implemented and executed in an "Update" logic sub-block ($F_i^{(U)}$), in order to calculate the corrective parameters $\delta\theta_i$ to be applied to the current value of the internally stored parameter $\theta_i$ from the errors $(e_{i+1,0}, \ldots, e_{i+1,m_{i+1}-1})$ returned by the sub-block $F_{i+1}^{(P)}$; this function is generally written in the form $\delta\theta_i$=update($e_{i+1,0}, \ldots, e_{i+1,m_{i+1}-1}$).

According to another particular feature, each neuron comprises at least one implementation and one execution of a sequence of elementary processes of the following form:

the sub-block $F_i^{(N)}$ performs $(x_{i+1,0}, \ldots, x_{i+1,m_{i+1}-1})$=next $(x_{i,0}, \ldots, x_{i,m_i-1})$, $x_{ij} \in K^{q_{ij}}$ where $q_{ij}$ is an integer and K is the real number space or the complex number space the sub-block $F_i^{(P)}$ performs, $(e_{i,0}, \ldots, e_{i,m_i-1})$=propagate $(e_{i+1,0}, \ldots, e_{i+1,m_{i+1}-1})$ the sub-block $F_i^{((U))}$ performs $\delta\theta_i$=update$(e_{i+1,0}, \ldots, e_{i+1,m_{i+1}-1})$.

According to another particular feature, the addition of nonlinearity to the output of the last block ($H_i^{(N)}$) of the network is implemented by the function:

$$z_j = NL(y_j) \text{ wherein}$$

$z_j$ is the outgoing signal from a decision-making device in the last block $y_j$ is an equalized or demodulated sample the decision-making block being defined by the comparison of the result obtained by the output y of the phase block with a finite constellation of possible results stored by the decision-making block, and deciding to take, from the possible results, the one for which the distance with the representative point of the output y is the smallest.

According to another particular feature, the back-propagation of the computed errors is obtained by the following processes, implemented and executed by an algorithm for back-propagation of the error:

initialization of the back-propagation in the form $$\text{for } 0 \le k < N, e_{L,k} = \overline{z_k - y_k}$$

Propagation of the error by the sub-neuron $F_i^{(P)}$ in the function $(e_{1,0}, \ldots, e_{i,m_i-1})$=propagate $(e_{i+1,0}, \ldots, e_{i+1,m_{i+1}-1})$ according to the calculations $$\forall\, 0 \le j < m_i,\ e_{i,j} = \sum_k e_{i+1,k} \cdot \frac{\partial F_{i,k}}{\partial x_{i,j}}$$

According to another particular feature, the update of the internal parameters $\theta_i$ of each neuron $F_i$ is obtained in the sub-neuron $F_i^{(U)}$ by the processes, implemented and executed in the function $\delta\theta_i$=update$(e_{i+1,0}, \ldots, e_{i+1,m_{i+1}-1})$ according to:

Calculation of $\Delta_i$:

$$\text{For } 0 \le j < M_{i+1},\ D_{i,j} = e_{i+1,j} \cdot \frac{\partial F_{i,j}^{(N)}}{\partial \theta_i}$$

$\Delta_i \Sigma_j D_{i,j}$

Updating of $\theta_i$:

$$\theta_i + 2\mu R(\Delta_i) \text{ if } \theta_i \text{ is in a Rvector space}$$

$$\theta_i += 2\mu\Delta_i \text{ if } \theta_i \text{ is in a Cvector space}$$

Where $-\mu_i$ is a real parameter called "learning speed".

$\delta\theta_i$ is the corrective parameter of the parameter $\theta_i$ $D_{ij}$ is an intermediate quantity of auxiliary calculations that can be temporarily stored.

According to another particular feature, as the samples input into the system are processed by the different sub-blocks, the arbitrarily initialized values of the different parameters $\theta_i$ converge on values making the demodulation effective.

According to another particular feature, the specialized neuron network constitutes a sequence of MIMO blocks ("multi inputs, multi outputs").

According to another particular feature, the method further comprises the storage, by at least one buffer memory, of the plurality of inputs and, in at least one other buffer, of the plurality of outputs of each specialized neuron of the network.

According to another particular feature, upon initialization of the computer system constituting a demodulator of the $\theta_i$ are provided by default by a system memory, in the first moments of the execution of the method, the system allows the convergence of the $\theta_i$ on relevant values.

According to another particular feature, when the distances between the calculated values and those stored by the demodulator and defining a vicinity are below certain thresholds pre-stored by the demodulator, the outputs of the demodulator are then delivered to a user device.

Another aim is to overcome one or more of the disadvantages of the prior art relating to implementing or executing a method for the blind demodulation of digital telecommunication signals in computing hardware. The method enables the separation of the components of a dual-channel signal received after mixing.

This aim is achieved by a computer program product implemented on a memory medium, capable of being executed within a computing processing unit, either by hardware or a combination of hardware and firmware, and comprising instructions for executing a method according to any one of the preceding claims.

Another aim is to overcome one or more of the disadvantages of the prior art relating to the application of a method for the blind separation and demodulation of digital telecommunication signals with linear modulation in a computing network.

This aim is achieved by a use in a system for the blind demodulation of a telecommunication signal, the system comprising at least one network of specialized neurons each respectively defining a filtering by a first specialized neuron, an amplification gain by a second specialized neuron, the frequency of the signal by a third specialized neuron and the phase value of the signal by a fourth specialized neuron; characterized in that the method according to any one of the preceding claims is executed in order to determine the characteristics of the blind-transmitted signal.

Other particular features and advantages of the present invention are detailed in the following description.

DESCRIPTION OF THE ILLUSTRATIVE FIGURES

Figure 2:
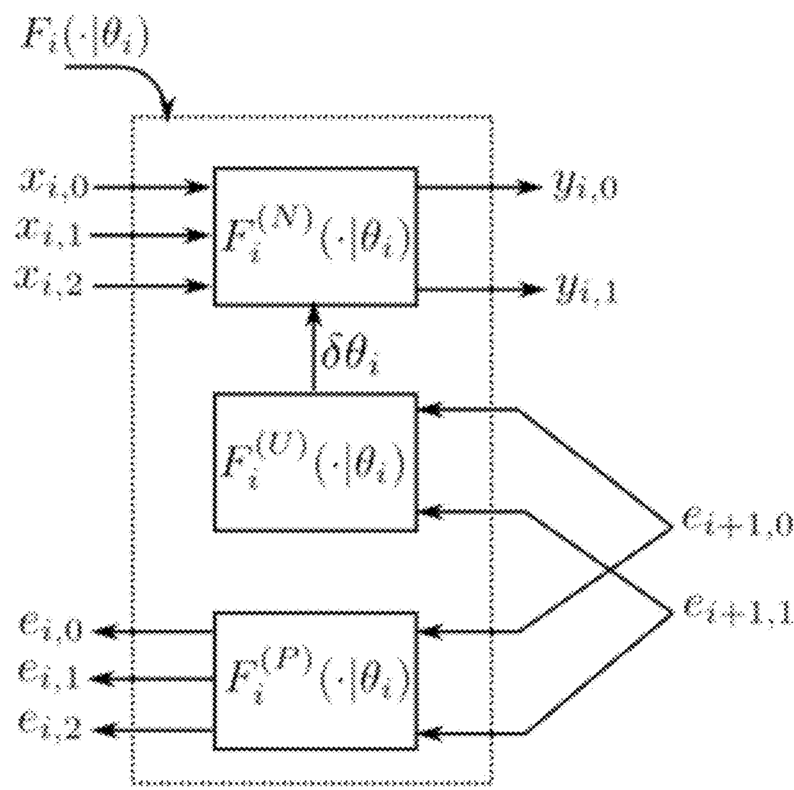
Figure 3:
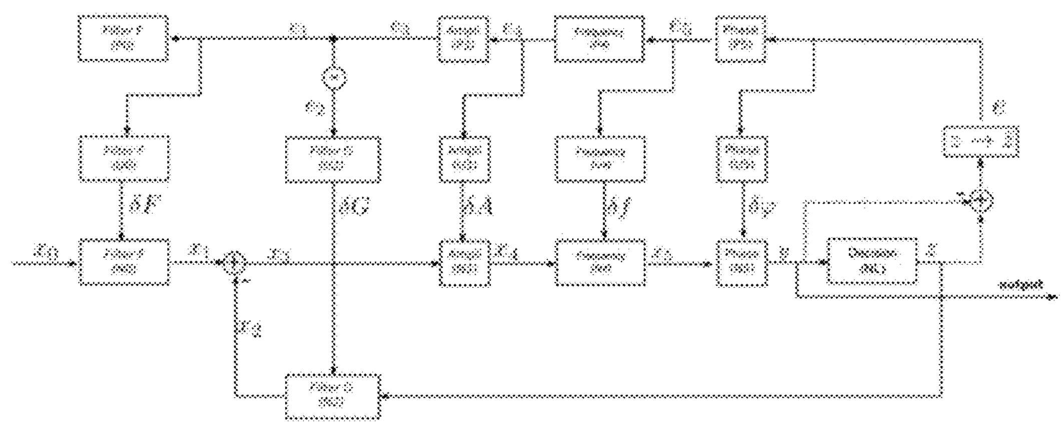
Figure 4:
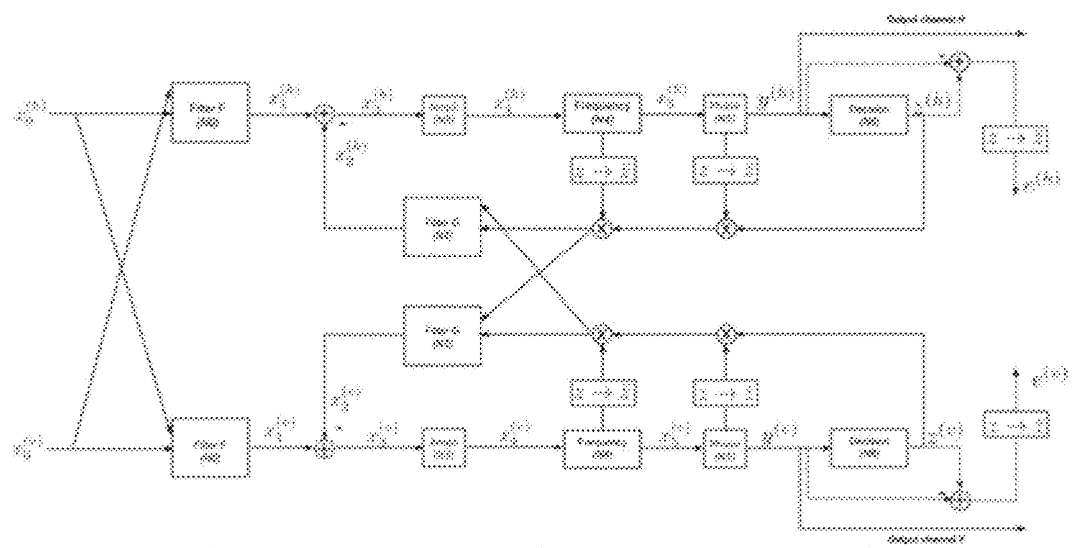
Figure 5:
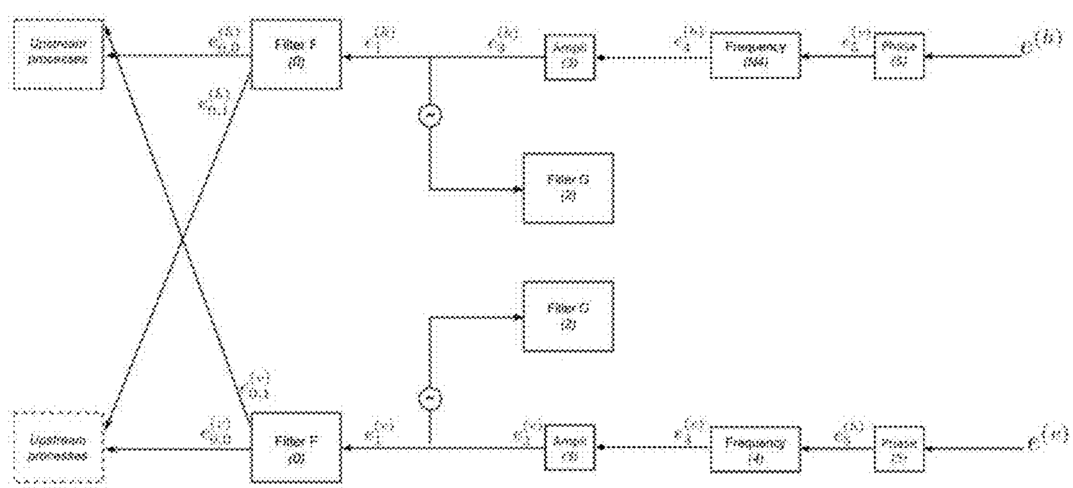

Other special features and advantages of the present invention will become clear from reading the following description, made in reference to the appended drawings, wherein:

FIG. 1 schematically shows the integration of a "specialized neuron" $F_i$ in a set of upstream neurons ($G_i$) and a set of downstream neurons ($H_i$) of a real-time method for the separation and blind demodulation of digital telecommunication signals, to be implemented in at least one embodiment of the invention;

FIG. 2 schematically shows the processes carried out by the specialized neuron named of the network, according to one embodiment of the invention;

FIG. 3 schematically shows a processing chain of a single-channel blind demodulator, according to one embodiment of the invention;

FIGS. 4 and 5 schematically show a processing chain of a multi-channel blind demodulator (comprising at least two channels), respectively allowing the generation and transmission to the next block of a plurality of outputs of the preceding block and the back-propagation of the computed errors represented in FIG. 5.

The same references may designate identical or similar elements in the different figures.

DESCRIPTION OF THE PREFERRED EMBODIMENTS OF THE INVENTION

It will be noted hereinafter that each specialized neuron of the network corresponds to a processing logic block and comprises at least one functional sub-block or sub-module (or computation operator). Each of the blocks of the neurons comprises at least one computing machine and a software or code that can be executed by the machine in order to define one or more parameter(s) obtained by calculating one or more analytic function(s) (whether real or complex, and of one or more specific dimension(s).

This invention relates to a real-time method for the blind demodulation of digital telecommunication signals, based on the observation by sampling of a signal; this signal corresponds to the reception of a linear-modulation signal that has undergone deformations during transmission thereof, the processing process comprising the following steps:

- acquisition by sampling of $m_0$ signals, $(x_{0,0}, \ldots, x_{0,m_0-1})$ in order for each to constitute an input of a network of specialized neurons; each neuron $F_i$ being simulated by the outputs of an upstream chain $G_j$ and stimulating a downstream chain $H_i$; each set of samples passes through the same processing chain;
- for each new input sample, each sub-neuron $F_i^{(N)}$ is stimulated by the outputs of the upstream chain $G_i^{(N)}$ consisting of the cascading of the specialized neurons $F_0^{(N)}$ to $F_{i-1}^{(N)}$ and stimulating the downstream chain $H_i^{(N)}$ consisting of the specialized neurons $F_{i+1}^{(N)}$ to $F_{L-1}^{(N)}$; the processing carried out by the sub-module $F_i^{(N)}$ depends on a parameter stored internally $\theta_i$; the outputs of the last neuron $F_{L-1}^{(N)}$ constitute the outputs of interest of the system or the demodulated signals and are noted as $y_0 \ldots y_N$;
- a nonlinear function (NL) is applied independently to each demodulated signal $y_j$ to produce the variables $(z_j)$ and calculate the chain-end errors $e_j=\overline{z_J-y_J}$; back-propagation of the error and updating of the parameter $\theta_i$;
- an error signal passes through the network in the opposite direction: from neuron $F_{L-1}$ to neuron $F_0$; the input error of neuron $F_{L-1}$ is the vector $(e_{L-1,0}, \ldots, e_{L-1,N-1})=(e_0, \ldots, e_{N-1})$; as it passes through neuron j, the error is modified by sub-neuron $F_j^{(P)}$ before being transmitted to neuron $F_{j-1}$; in parallel with the back-propagation of the error from neuron j to neuron j−1, the error coming from neuron j+1 is input to the sub-neuron $F_j^{(U)}$ which produces a corrective term $\delta\theta_i$ which allows the internal parameter $\theta_i$ to be updated according to $\theta_i$+=$\delta\theta_i$.

This computed error can correct the current value of $\theta_1$ for each block. The outputs of the last blocks of the network ideally correspond to the demodulated symbols.

These telecommunication signals can include deformations comprising, in particular: a channel filter (and a co-channel filter in the dual-channel case), an amplification, a phase value, a carrier leak, noise and other stochastic disturbances such as phase noise. Thus, according to the invention, the demodulation network will correct these different effects through specialized processing neurons. Specialized processing neurons are intended to mean one or more functions of which the parameters can be updated by back-propagation.

In some embodiments, the parameters $\theta_i$ of the different processing blocks are initially predefined, for example arbitrarily without deviating from the expected values. For each sample entering the system and for each neuron i, our system produces a corrective term $\delta\theta_i$ which is added to the current value of the parameter $\theta_i$:$\theta_i$+=$\delta\theta_i$. This update equation produces a sequence of values of $\theta_i$ which converge on the value $\theta_i$ which makes it possible to best demodulate the input signal.

In some embodiments, each neuron $F_i$ of the network specifically carries out:

- a processing of a "next" function, implemented and executed in the processing logic sub-block $F_i^{(N)}$ to generate outputs from a plurality of signal observations and transmit them to the processing block of the next neuron of the network; for the neuron $F_i$, this function is generally written with its inputs/outputs as $(x_{i+1,0}, \ldots, x_{i+1,m_{i+1}-1})=\text{next}(x_{i,0}, \ldots, x_{i,m_i-1})$ where $m_i$ is the number of inputs and $m_{i+1}$ is the number of outputs of $F_i^{(N)}$ which corresponds to the number of inputs of $F_{i+1}^{(N)}$. Each processing is parameterized by a set of parameters $\theta_i$ hence the notation $f_i^{(N)}=F_i^{(N)}(\cdot|\theta_i)$ when it is sought to recall the importance of the parameterization. Each "Next" function is shown in FIGS. 3 to 5 by a block $N_i$;
- a processing of a "Propagate" function, implemented in the logic sub-block $F_i^{(P))}$ to calculate the errors $(e_{i,0}, \ldots, e_{i,m_i-1})$ from the errors $(e_{i+1,0}, \ldots, e_{i+1,m_{i+1}-1})$ provided by the block $F_{i+1}^{(P)}$ or by $(e_{L-1,0}, \ldots, e_{L-1,N-1})=(e_0, \ldots, e_{N-1})$ with $e_j=\overline{z_J-y_J}$ either at the end of the chain or at the input $F_{L-1}^{(P)}$. This function is written, for the $i^{th}$ neuron: $(e_{i,0}, \ldots, e_{i,m_i-1})=\text{propagate}(e_{i+1,0}, \ldots, e_{i+1,m_{i+1}}{}^{-1})$. Each "Propagate" function is shown in FIGS. 3 to 5 by a block $P_i$ called residual block;
- a processing of an "Update" function, implemented and executed in the logic sub-block $F_i^{(U)}$ to calculate the corrective term $\delta\theta_i$ to be applied to the current value of the internally stored parameter $\theta_i$ from the errors $(e_{i+1,0}, \ldots, e_{i+1,m_{i+1}-1})$ returned by the sub-block $F_{i+1}^{(P)}$. This function is generally written as follows: $\delta\theta_i=\text{update}(e_{i+1,0}, \ldots, e_{i+1,m_{i+1}-1})$. Each "Update" function is shown in FIGS. 3 to 5 by a $U_i$ block called the residual block.

"Implemented and executed" is intended to mean either the execution of a program corresponding to the mathematical functions or formulas (explained in the text) by computing hardware (such as a microprocessor and a memory), or by hardware or a combination of hardware and firmware.

Thus, as shown, for example, in FIG. 2, each neuron $F_i$ encapsulates at least two logic sub-neurons which each implement at least one of the two functions "update" and "next" below and the "propagate" function which is not necessarily implemented by the first block ($G_i$):

$F_i^{(N)}$ implements$(x_{i+1,0}, \ldots, x_{i+1,m_{i+1}-1})$=next$(x_{i,0}, \ldots x_{i,m_i-1})$ $F_i^{(P)}$ implements$(e_{i,0}, \ldots, e_{i,m_i-1})$=propagate $(e_{i+1,0}, \ldots, e_{i+1,m_{i+1}-1})$ $F_i^{(U)}$ implements $\delta\theta_i$=update$(e_{i+1,0}, \ldots, e_{i+1,m_{i+1}-1})$ FIG. 1, for example, schematically shows the integration of a "specialized neuron" $F_i$ in an upstream chain or set of neurons ($G_i$) and in a downstream chain or set of neurons ($H_i$) of a real-time method for the blind demodulation of digital telecommunication signals. The neuron $F_i$ is connected at the input to the last of the neurons of the set $G_i$, and at the output of the first of the set $H_i$.

In some embodiments, one of the processing blocks $F_i^{(N)}$ comprises at least one program implementing and executing a sequence of elementary processes of the following form:

$F_i^{(N)}$ performs$(x_{i+1,0}, \ldots, x_{i+1,m_{i+1}-1})$=next$(x_{i,0}, \ldots, x_{i,m_i-1})$, $x_{ij} \in K^{q_{ij}}$ where $q_{ij}$ is an integer and K is the real number space or the complex number space.

$F_i^{(P)}$ performs$(e_{i,0}, \ldots, e_{i,m_i-1})$=propagate$(e_{i+1,0}, \ldots, e_{i+1,m_{i+1}-1})$ $F_i^{(U)}$ performs $\delta\theta_i$=update$(e_{i+1,0}, \ldots, e_{i+1,m_{i+1}-1})$ The processing performed by the block ($F_i^{(N)}$) depends on a parameter $\theta_i$ which can be a real or a complex number, a vector which is itself either real or complex, etc.

In some embodiments, the "Next" function implemented in the sub-neuron or sub-block $F_i^{(N)}$ is analytically known and depends on a parameter $\theta_i$.

It can be noted $(x_{i+1,0}, \ldots, x_{i+1,m_{i+1}-1}) = F_i^{(N)}(x_{i,0}, \ldots x_{i,m_i-1}|\theta_i)$.

The elementary projections of the output vector on the component $x_{i+1,j}$ can be noted as $F_{i,j}^{(N)}$.

In some embodiments, as shown, for example, in FIG. 1, a network of specialized neurons (which can be arranged in a demodulator) for blind demodulation of a telecommunication signal in linear modulation, comprises in each of the neurons a processing block ($G_i^{(N)}$, $F_i^{(N)}$, $H_i^{(N)}$). The first processing block ($G_i^{(N)}$) receives two signals each corresponding to a first plurality of observations of the signal in order to generate a plurality of outputs which are transmitted to the following logic block ($F_i^{(N)}$). The logic block ($F_i^{(N)}$) integrates the plurality of outputs to generate in turn another plurality of outputs which are transmitted to the last logic block ($H_i^{(N)}$) of the network. This last block ($H_i^{(N)}$) in turn integrates the plurality of outputs of the previous logic block ($F_i^{(N)}$) to also generate a plurality of outputs. A nonlinear filter is applied to the output of the last block ($H_i^{(N)}$), in order to calculate an error signal (e) to be able to back-propagate this computed error to each of the inputs of the network associated with the respective input of the network.

In some embodiments, the set of L blocks can execute a processing chain of the following form, implemented and executed by at least one program:

For every $0 \le i < L$ $$(y, \ldots, y_{N-1}) = H_i^{(N)}(F_{i,0}^{(N)}(x_{i,0} \ldots x_{i,M_i-1} | \theta_0), \ldots, F_{i,N_i-1}^{(N)}(x_{i,0} \ldots x_{i,M_i-1} | \theta_{n_i-1}) | \theta_{i+1:L-1})$$

with $$(x_{i,0}, \ldots, x_{i,m_i-1}) = G_i^{\theta}(x_{0,0}, \ldots, x_{0,m_0-1} | \theta_{0:i-1}) = (G_{i0}^{\theta}(x_{0,0}, \ldots, x_{0,m_0-1} | \theta_{0:i-1}), \ldots, G_{i,m_i-1}^{\theta}(x_{0,0}, \ldots, x_{0,m_0-1} \theta_{0:i-1}))$$

A number of L blocks are chained in succession to perform an overall processing.

The chaining of blocks 0 to i−1 is noted as $G_i^{(N))(\ldots|\theta_{0:1-1})}$ and the succession of blocks i+1 to L−1 is noted as $H_i^{((N))(\ldots|\theta_{i+1:L-1})}$. The outputs of the last block are noted as $y_0, \ldots, y_{N-1}$.

Note that in $F_{i,0}^{(N)}(x_{i,0} \ldots x_{i,m_i-1}|\theta_i), \ldots, F_{i,n_i-1}^{(N)}(x_{i,0} \ldots x_{i,m_i-1}|\theta_i)$ the $n_i$ projection functions are giving $Y_{i,k} = F_{i,k}^{(N)}(x_{i,0} \ldots x_{i,m_i-1}|\theta_i)$ for $0 \le k < n_i$.

In some embodiments, the variables on which each block output depends can be explained according to the following notation: $y_j = y_j^{\theta}(x_{0,0} \ldots x_{0,m_0-1})$. Each block output can be a real or complex value or even a vector value.

In some embodiments, the addition of the nonlinearity at the output of the last block ($H_i^{(N)}$) of the network is executed by a function implemented in a program which is written as:

$z_j = NL(y_j)$ wherein $z_j$ is the outgoing signal from a decision-making device in the last block $y_j$ is a demodulated sample In some embodiments, the back-propagation of the computed errors is obtained by the following processes, implemented and executed by an algorithm for back-propagation of the error:

initialization of the back-propagation in the form for $0 \le k < N, e_{L,k} = \overline{z_k - y_k}$ Propagation of the error by the sub-neuron $F_i^{(P)}$ in the function $(e_{i,0}, \ldots, e_{i,m_i-1})$=propagate$(e_{i+1,0}, \ldots, e_{i+1,m_{i+1}-1})$ according to the calculations $$\forall\, 0 \le j < m_i,\ e_{i,j} = \sum_k e_{i+1,k} \cdot \frac{\partial F_{i,k}}{\partial x_{i,j}}$$

In some embodiments, the update of the internal parameters $\theta_i$ of each neuron $F_i$ is obtained in the sub-neuron $F_i^{(U)}$ by the processes, implemented and executed in the function $\delta\theta_i$=update$(e_{i+1,0}, \ldots, e_{i+1,m_{i+1}-1})$ according to:

Calculation of $\Delta_i$:

$$\text{For } 0 \le j < M_{i+1},\ D_{i,j} = e_{i+1,j} \cdot \frac{\partial F_{i,j}^{(N)}}{\partial \theta_i}$$

$$\Delta_i = \sum_j D_{i,j}$$

Updating of $\theta_i$:

$\theta_i = 2\,\mu R(\Delta_i)$ if $\theta_i$ is in a R vector space $\theta_i = 2\mu\Delta_i$ if $\theta_i$ is in a C vector space Where $\mu_i$ is a real parameter called "learning speed".

$\delta\theta_i$ is the corrective parameter for parameter $\theta_i$ $D_{ij}$ is an intermediate quantity of auxiliary calculations that can be temporarily stored in a memory or registers of the hardware executing the implementation the $\theta_i$ are stored temporarily.

In some embodiments, as the samples input into the system are processed by the different sub-blocks, the values of the different $\theta_i$, which may be arbitrarily initialized, converge on values making the demodulation effective.

In some embodiments, the network of specialized neurons constitutes a sequence of MIMO ("multi inputs, multi outputs") blocks, each block (i) performing a parameterized elementary processing by a set $\theta_i$. If all the $\theta_i$ of the chain are correctly set, the chain proceeds to the effective demodulation of the signal.

In some embodiments, the $\theta_i$ are not known, and the chain enables the in-line learning of the relevant values for each $\theta_i$. When the system is initialized, $\theta_i$ are provided by default by a memory or buffer. In the first moments, the system enables the convergence of the parameters $\theta_i$ on relevant values; this phase is called the convergence phase; the demodulated signal produced at the output is thus not reliable. When the system reaches the vicinity of the parameters $\theta_i$, the process enters the production or monitoring phase. That is to say that the distances between the calculated values and those stored and defining a vicinity are lower than certain pre-stored thresholds. The outputs of the demodulator are then reliable and can be used together with the demodulation of the signal, the system continues with the variation of the parameters of the system. The system does not explicitly shift from one mode to the other; the second phase (or production phase) takes place as a continuation of the first.

In some embodiments, the method further comprises the storage, by at least one memory buffer, of the plurality of inputs and, in at least one other buffer, of the plurality of outputs of each specialized neuron of the network. The sample values extracted from the plurality of inputs of the signal can be transmitted into a first buffer, which may be associated with the corresponding processing block either temporarily or permanently depending on the desired application, so as to store the internal states of the input signal during an initiation phase. The values of the plurality of inputs can be stored in a second buffer which may be associated with a corresponding processing block either temporarily or permanently depending on the desired application, so as to store the internal states of the output signal.

In some embodiments, the memory buffers are of FIFO ("First-In-First-Out") type, defining a method for organizing and manipulating a data buffer in which the first data input are processed first. Hereinafter, a FIFO memory buffer will be considered to be a vector. Thus, in some embodiments, the terms of the vector may go from the oldest (first index of the vector) to the most recent (last index of the vector) element of the FIFO buffer.

In some embodiments, in the case of the blind demodulation of a digital telecommunication signal with linear modulation, two types of signals are identified:

- single-channel signals: this is a conventional signal in which a stream of information is transmitted on a medium;
- multi-channel signals or XPIC ("cross-polarization interference canceler"): these are several signals which are multiplexed over the two polarizations of the electromagnetic wave.

A representation of the single-channel signal in baseband may be of the following form:

$$x_{b(t)} = \sum_{k=-\infty}^{+\infty} s_k h(t - kT)$$

Where $(s_k)$ is a sequence of complex numbers included in a finite sub-set referred to as constellation, h is a shaping filter, and T is the symbol for time.

During its transmission, this signal undergoes different alterations and it may be received in the following form:

$$x(t)=e^{2\pi Jf_0t}(Ae^{J\varphi}x_b(t-\delta t)+g*x_b(t))+\eta(t)$$

Where

- $f_0$ is the carrier frequency
- A is the amplitude of the main path
- $\varphi$ is the main phase
- $\delta t$ is the delay of the main path
- g is a filter which represents several phenomena: propagation channel caused by multiple paths, disruptive filter introduced by the imperfections of the electronic equipment
- $\eta$ is a complex noise In the case of the single-channel signal, the demodulation consists of finding the sequence $(s_k)$ from the observation of a sampled version of x(t).

A multi-channel signal representation, using two polarizations to transmit two signals, in baseband, can be of the following form:

$$x_b^H(t)=\Sigma_{k=-\infty}^{+\infty}s_k^Hh(t-kT) \text{ and}$$

$$x_b^v(t)=\Sigma_{k=-\infty}^{+\infty}s_k^Vh(t-kT)$$

These signals are transmitted together on the polarizations H and V of the electromagnetic wave. The two signals are received in the following form:

$$x^H(t)=e^{2\pi Jf_0t}(A^He^{J\varphi^H}x_b^H(t-\delta t^H)+g_{HH}*x_b^H(t)++g_{VH}*x_b^V(t))+\eta^H(t)$$

$$x^V(t)=e^{2\pi Jf_0t}(A^Ve^{J\varphi^H}x_b^V(t-\delta t^V)+g_{VV}*x_b^V(t)++g_{HV}*x_b^H(t))+\eta^V(t)$$

Where

- $f_0$ is the carrier frequency
- $A^H$, $A^V$ is the amplitude of the main path on the channel H and on the channel V
- $\varphi^H$, $\varphi^V$ is the main phase on the channel H and on the channel V
- $\delta t^H$, $\delta t^V$ is the delay of the main path on the channel H and on the channel V
- $g_{HH}$ is a filter which represents the channel of the signal H on the reception channel H
- $g_{VH}$ is a filter which represents the channel of the signal V on the reception channel H
- $g_{VV}$ is a filter which represents the channel of the signal V on the reception channel V
- $g_{HV}$ is a filter which represents the channel of the signal H on the reception channel V
- $\eta^H$, $\eta^V$ is complex noise on each reception channel.

In the case of the multi-channel signal, demodulation consists of finding the sequences $(s_k^H)$ and $(s_k^V)$ from the observation of a sampled version of the pair signal $(x^H(t), x^V(t))$.

The equalization of the signal consists of reversing the transmission channels as best as possible. It is therefore sought to designate an equalization function. Such a function requires numerous parameters (frequency, amplitude, equalization filters, etc.). In a "non-blind" transmission mode, known sequences of the transmitter and the receiver are transmitted regularly and make it possible to regulate the equalizer. In a blind context, no sequence is known and the function is difficult to find.

In some embodiments, the present invention makes it possible to find the equalization function in the context of blind demodulation.

In some embodiments, the present invention can be applied equally in a blind context as well as in a non-blind one, but appears particularly beneficial in the former context. Indeed, this invention makes it possible to regulate a parameterizable processing chain without any prior knowledge. The invention is particularly relevant when several parameters are involved.

In some embodiments, a single-channel signal is defined as a linearly modulated digital signal transmitted by frequency transposition over a finite bandwidth. A dual-channel signal is defined as a pair of single-channel signals multiplexed over two orthogonal polarizations.

The method applied in a certain scheme makes it possible in particular to demodulate a single-channel signal of linear modulation by compensating: the amplification of the signal, its phase, its carrier leak, the effects of the propagation channel. The method applied according to another scheme to demodulate a dual-channel signal and to separate the two components thereof by compensating: the amplification of the signals, their phases, the carrier leaks, the effects of the propagation channel and the effects of the propagation co-channel (leak from one polarization to the other and vice-versa during the propagation of the signal).

Without losing the general nature and in order to simplify the explanations hereinbelow, it is possible for example to consider a single-channel signal to be a particular case of dual-channel signal.

In some embodiments, for example as shown in FIGS. 3 to 5, the calculation principles of the method of the present invention in order to determine the filter(s), the amplification, the frequencies of the signal and the phase values of the signal can be executed in a blind demodulator of a single-channel signal and/or of a multi-channel signal.

Thus, FIG. 3 shows an example of an embodiment of a network of specialized neurons for the blind demodulation of single-channel signal. FIG. 3 shows the succession of the processing blocks (N0 to N6) then the back-propagation of the error (e) through the blocks (P5 to P0), each of which may represent a characteristic of the signal. The errors enable the on-the-fly calculation in the blocks of the chain (U5 to U0) of the increments of the different parameters to be applied to the processing blocks. Each of the blocks U5 to U0 constituting "updates" modules, implementing the "Update" function. The block P0, implementing the "Propagate" function, comprises an output which can be associated with a possible upstream chain, for example, for synchronization. The filter F can make it possible to compensate the deformation of the signal due to propagation. The demodulator comprises several processing modules (Nx where x=0 to 4), each for a parameter NO (filter), N2 (amplification), N3 (frequency) and N4 (phase), each associated with an "Update" block (Ux where x=0 to 3) and a "Propagate" block (Px where x=0 to 3). A filter block generating a plurality of observations of the input signal (x), which can be stored in a memory buffer, is applied to the first processing block NO. This block (NO) produces filtering of the input signal (x) by storing the last values of said input signal in an internal FIFO buffer. Its output constitutes the input of the block (N1) correcting the amplification of the signal such that the power at its output constitutes the input of the block (N2) correcting the signal carrier drift. The output of (N2) constitutes the input of (N3) which corrects the signal phase. The processing module or block or logic sub-neuron (N3) is the last specialized neuron in the chain. Its complex output (y) applies the nonlinearity (N4) which is the decision function or slicer associated with the modulation of the signal. The output of the block (N4) is z. For example, the error (e) is calculated by performing the conjugation of the difference between a plurality of decision outputs (z) and the plurality of outputs (y). The error associated with the processed sample is $e_4=\overline{z-y}$. It is injected (or back-propagated) in parallel in the "propagate" block (P3) and in the "update" block (U3). The block (P3) makes it possible to calculate the $e_3$ error and the block (U3) makes it possible to calculate the $\delta\varphi$ increment to be applied to the current value of the phase in the module (N3). The error $e_3$ then passes through the blocks (P2) producing the error $e_2$ and the block (U2) which makes it possible to calculate the frequency increment $\delta f$ to be applied to the current value of the frequency in (N2). The error $e_2$ then passes through the blocks (P1) producing the error $e_1$ and the block (U1) which makes it possible to calculate the amplitude increment $\delta A$ to be applied to the current value of the amplitude in the block (N1). Finally the error $e_1$ then passes through the blocks (P0) producing the error $e_0$ and the block (U0) which makes it possible to calculate the vectorial increment $\delta F$ to be applied to the current value of the filter in (N0). The value ($e_0$) is not used here but could be back-propagated to an upstream network performing specialized tasks such as, for example, the synchronization of the signal.

The succession of the processing blocks, the back-propagation of the error calculated through the "propagate" blocks and the increment of the different parameters of the blocks of the chain via the "update" blocks may be performed in a cascade and in a loop until the different parameters of the signal have been estimated as precisely as possible.

In certain embodiments, the method applied according to another scheme makes it possible in particular to demodulate a dual-channel signal and to separate the two components thereof by compensating: the amplification of the signals, their phases, the carrier leaks, the effects of the propagation channel and the effects of the propagation co-channel (leak from one polarization to the other and vice-versa during the propagation of the signal).

FIGS. 4 and 5 show an example of an embodiment of a network of specialized neurons for the blind demodulation of multi-channel signal, applied in a blind demodulator. FIG. 4 shows the succession of the processing blocks from the reception of the two input samples $x_0^H$ and $x_0^V$, FIG. 5 shows the succession of the propagation and update blocks from the errors $e^H$ and $e^V$ calculated at the end of the processing chain. Thus, two blocks NO each receive an input signal to generate the output signals $x_v$ and $x_h$.

In FIG. 4, each of the NO processing blocks of one of the two channels each receives two input signals $x^h{}_0$, $x^v{}_0$ representing respectively a sampling of each channel, to generate the output signals $x^v{}_1$ and $x^h{}_1$. The signals ($x_{3\,h}$ and $x_3{}^v$) are representative of a correction applied to each signal $x_0$ by the respective output signals $x_2{}^v$, $x_2{}^h$, of each of the filters G of each channel, each emulated by a processing block N2. The signals $x_{3h}$ and $x_3{}^v$ are sent to the serial cascades of the processing blocks N3, N4 and N5 of each channel, each emulating the signal indicating the amplification of the channel (ampli), for block N3, respectively the frequency (fq) of the channel for block N4 and respectively the phase ($\varphi$) of the channel for block N5.

Each respective output $y^h$, $y^v$ of each processing block N5 emulating the phase of each channel H and V is sent to each decision block N6 of each channel and to each of the respective inputs of the scheme in FIG. 5. An error signal (e) is calculated for each channel of the system by conjugating the difference between a plurality of decision outputs (z) of each channel and the plurality of outputs (y) of the same channel. The output $Z^h$, $Z^v$ of each decision block is also sent to a pair of multipliers ($M_1{}^h$, $M_2{}^h$, $M_1{}^v$, $M_2{}^v$), respectively receiving one from the phase block and the other from the frequency block fq. The output of the last multiplier $M_2{}^i$ of each channel is sent to each of the filter blocks G ($N_2{}^h$, $N_2{}^v$) of each channel.

Thus, in FIG. 4, $x_0{}^H$ and $x_0{}^V$ are two samples at the input of the system. The pair ($x_0{}^H$, $x_0{}^V$) is the input of a first filter block (N0) and the returned pair ($x_0{}^V$, $x_0{}^H$) is the input of another filter block (N0). At the output of each of these blocks (NO), there is a single-channel processing chain duplicated apart from the filter. The two equalized outputs are $y^H$ and $y^V$ which constitute the two demodulated signals. The errors $e^H$ and $e^V$ are formed identically to the single-channel case.

In FIG. 5, errors $e^H$ and $e^V$ start the downshift chain. The error is firstly propagated into two sub-chains identical to the back-propagation chain of the single-channel case. For better legibility, the blocks (x) represent all of the blocks (Px with x=0 to 3) and (Ux with x=0 to 3) which have the same inputs. The output of the block (x) is the output of the block (Px). At the end of the back-propagation chain, each filtering block produces two errors which can interface with an optional upstream chain such as, for example, a synchronization chain.

These different steps of this method are therefore performed continuously in an automatic manner, in order to be able to optimize and self-regulate the calculations or operations carried out by the neurons (via at least one suitable algorithm) of the processing chain. This method for blind separation and demodulation of a signal of the present invention has the advantage of rapidly estimating in real time the different characteristics of the signals transmitted and of setting up a suitable correction for each signal transmitted by back-propagating it in the generic signal-processing chain. Moreover, the method of the present invention has the advantage of simply and effectively dealing with the problems associated with communication interception and preferably for the blind demodulation of telecommunication signals.

This invention also relates to a computer program product implemented on a memory medium, capable of being executed within a computing processing unit by computing hardware (such as a microprocessor and a memory); either by hardware or a combination of hardware and firmware, and comprising instructions for executing a method according to any one of the previous embodiments.

In some embodiments, this invention proposes a network architecture of "specialized" neurons to deal with the problems of communication interception and more particularly of blind demodulation of telecommunication signals.

Indeed, an input signal passes through a system having the above architecture to emulate a chain of specialized neurons; each neuron performs a particular function parameterized by a set of values. The values of the adjustments of each specialized neuron are unknown beforehand. A nonlinearity is applied to the result at the chain end, making it possible to calculate an "error". It is then possible to back-propagate this error in the processing chain as is done in neural network learning in order to evolve the value of each parameter of each block towards a more relevant value. Thus, in some embodiments, upon initialization of the system, parameters $\theta_i$ are provided by default by a memory of the device. In the first moments, the system enables the convergence of the parameters $\theta_i$ on relevant values; this phase is called the convergence phase; the demodulated signal produced at the output is then not reliable. When the system reaches a defined vicinity of the parameters $\theta_i$, the system enters the production or monitoring phase. That is to say that the distances between the calculated values and those stored and defining a vicinity are lower than certain pre-stored thresholds. The outputs of the demodulator are then reliable and can be used to be applied to other hardware or software or firmware elements allowing finalization of the demodulation.

With this system, once in production or monitoring mode, the calculations are less numerous and can be executed in parallel by the different elements materializing the blocks, thus enabling real-time use.

The present invention further relates to a use in a system for the blind demodulation of a telecommunication signal. The system for the demodulating or blind searching the characteristics of the signal comprises at least one hardware architecture or hardware and firmware implementing a network of specific neurons.

In certain embodiments, a first specialized neuron of the network performs the estimation of at least one filter enabling the blind acquisition of the signal and then a second one implements at least one module enabling the estimation of the amplification of the signals in order to subsequently evaluate the other characteristics of the signals by the other neurons of the network. In some embodiments, the amplification module can be arranged in a neuron other than the first neuron. A second specialized neuron implements at least one frequency estimation module for determining the frequencies of the blind-transmitted signals and/or at least one phase module for determining the phase values of said signals. In some embodiments, the phase module can be arranged in a neuron other than the second neuron. A third specialized neuron implements a decision module for calculating an error signal and back-propagating the errors calculated at each of the remaining blocks of the previous neurons. The method according to any one of the previous embodiments is applied to determine the characteristics of the blind-transmitted signal (for example, the amplitude, the frequency, and the phase value of the signals).

In some embodiments, the method for blind demodulation can be applied in the case of the demodulation of a single-channel signal (as shown for example in FIG. 3) and/or of a multi-channel signal (as shown for example in FIGS. 4 and 5).

In some embodiments, for a signal of multi-channel type, aside from the demodulation of each channel, the method enables the blind separation of the different channels.

The present application describes various technical features and advantages with reference to the figures and/or various embodiments. A person skilled in the art will understand that the technical features of a given embodiment may in fact be combined with features of another embodiment unless the opposite is explicitly mentioned or it is not obvious that these features are incompatible or that the combination does not provide a solution to at least one of the technical problems mentioned in the present application. In addition, the technical features described in a given embodiment may be isolated from the other features of this mode unless the opposite is explicitly stated.

It should be obvious for a person skilled in the art that the present invention allows embodiments in many other specific forms without departing from the scope of the invention as claimed. Therefore, the present embodiments should be considered to be provided for purposes of illustration, but may be modified within the range defined by the scope of the attached claims, and the invention should not be limited to the details provided above.

What is claimed is:

1. A system for demodulating or blind searching characteristics of digital telecommunication signals, based on an observation by sampling of a signal comprising parameters $\theta_i$ comprising equalization coefficients, a value of a phase ($\varphi$), an amplitude of the signal, frequency and symbol time of the parameters $\theta_i$, wherein the system comprises:

at least one hardware architecture or hardware and firmware comprising memories and one or more processing units for implementing a network of specific computation blocks connected to each other, of which a first specialized block of the network of specific computation blocks performs an estimation of at least one filter for blind signal acquisition, and a second block of the network of specific computation blocks that implements at least one module that estimates an amplification of signals that are observed in order to subsequently evaluate other characteristics of the signals that are observed by other computation blocks of the network of specific computation blocks, at least a third specialized computation block of the network of specific computation blocks that implements a decision module to calculate an error signal and back-propagate the error signal to each previous residual block of said specific computation blocks, wherein upon initialization of the system, the parameters $\theta_i$, are provided by default by a system memory, allowing in first instants, comprising a convergence phase, convergence of the parameters $\theta_i$, on relevant values; and, then, when the system reaches a defined vicinity of the parameters $\theta_i$, the system enters a so-called production or monitoring phase, in which distances between calculated values and those stored and defining a vicinity are less than some pre-stored thresholds, outputs of the system are then reliable and usable to apply them to a user device or to other hardware or software or firmware elements in order to finalize demodulation.

2. The system for demodulating or blind searching the characteristics of the digital telecommunication signals, according to claim 1, further comprising a specialized additional block connected to outputs of the second block and to inputs of the decision module, wherein the specialized additional block implements at least one frequency estimation module for determining frequencies of blind signals transmitted and/or at least one phase module for determining phase values of said blind signals transmitted.

3. The system for demodulating or blind searching the characteristics of the digital telecommunication signals, according to claim 2, wherein the at least one phase module is arranged in an additional computation block connected to outputs of the at least one frequency estimation module of the specialized additional block.

4. The system for demodulating or blind searching the characteristics of the digital telecommunication signals according to claim 3, wherein each of the one or more processing units of at least one of two channels receives each of two input signals ($x^h_0$, $x^v_0$) representing respectively a sampling of each channel of the two channels, to generate output signals $x^v_1$ and $x^h_1$, wherein signals $x_3^h$ and $x_3^v$ being representative of a correction applied to each signal $x_0$ by respective output signals $x_2^v$, $x_2^h$, of each filter of the at least one filter of each channel of said two channels, each emulated by a processing block N2 of the one or more processing units, the signals $x_3^h$ and $x_3^v$ are sent to serial cascades of processing blocks N3, N4 and N5 of each channel, each emulating the signal indicating the amplification of a channel for block N3, respectively a frequency of a channel for block N4 and respectively the phase ($\varphi$) of a channel for block N5.

5. The system for demodulating or blind searching the characteristics of the digital telecommunication signals, according to claim 4, wherein each respective output $y^h$, $y^v$ of each processing block N5 emulating the phase of each channel H and V is sent to each decision block N6 of said each channel and to each of respective inputs of a back-propagation circuit of at least two errors ($e^h$ and $e^v$) through mirror blocks which allow an on-the-fly calculation of increments of different parameters of the specific computation blocks, the system further comprising several processing modules of a plurality of observations of each input signal ($x_i$), each associated with an update mirror or residual block for each phase, a frequency and amplification parameter and a corresponding propagate mirror or residual block for said each phase, the frequency and the amplification parameter.

6. The system for demodulating or blind searching the characteristics of the digital telecommunication signals, according to claim 4, wherein output $Z^h$, $Z^v$ of each decision block, is also sent to a pair of multipliers ($M_1^h$, $M_2^h$, $M_1^v$,$M_2^v$), respectively receiving, one from a phase block and another from a frequency block fq; an output of a last multiplier $M_2^i$ of each channel is sent to said each filter of the at least one filter of said each channel, each emulated by a processing block ($N_2^h$, $N_2^v$) of said each channel.

7. A real-time method of separation and blind demodulation of digital telecommunication signals, based on an observation of a sampled version of a signal and comprising internal parameters, comprising equalization coefficients, a value of a phase ($\varphi$), an amplitude of the signal, and frequency and symbol time of the internal parameters, wherein the real-time method comprises:

acquisition, by a sampling, of a first plurality of the signal in order to each constitute an input of a network of processing blocks ($G_i$, $F_i$, $H_i$) comprising specialized neurons, each neuron of the specialized neurons being simulated by outputs of a preceding block of the processing blocks, the first plurality of the signal being input into a first block of the processing blocks simulating a first neuron of the network in order to generate a plurality of outputs of the first block;

wherein each neuron $F_i$ of the specialized neurons is simulated by outputs of an upstream chain $G_j$ and stimulating a downstream chain $H_i$;

wherein each set of samples passes through a same processing chain;

outputs of last block of the network of processing blocks correspond to demodulated symbols;

addition of a nonlinearity to each of the outputs of the last block of the network to calculate an error signal and propagation of the error signal in a reverse direction of a processing chain as back-propagation;

estimation, upon receipt of the error signal by each neuron (i) of the specialized neurons, of a corrective term $\delta\theta_i$ and updating, in each block of the network of processing blocks, of a value of a parameter $\theta_i$, according to $\theta_i$+=$\delta\theta_i$.

8. The real-time method according to claim 7, wherein each neuron ($F_i$) of the network performs a processing of a next function, implemented and executed in a processing logic sub-block ($F_i^{(N)}$), to generate outputs from a plurality of signal observations and transmit them to a processing block of a next neuron of the network;

wherein the next function comprises ($X_{i+1,0}$, . . . $X_{i+1,m}$ $^{-1}$)=next($X_{1,0}$, . . . ,$X_{i,m_i-1}$) with $m_i$ being a number of inputs and $m_{i+i}$ a number of outputs of $F_i^{(N)}$ which corresponds to a number of inputs of $F_{i+1}^{(N)}$;

a processing of a propagate function, implemented and executed in a propagate logic sub-block ($F_i^{(P)}$) in order to calculate errors ($e_{i+1,0}, \ldots, e_{i+1,m_{i+1}-1}$) provided a block $F_{i+1}^{(P)}$ or by ($e_{L-1,0}, \ldots, e_{L-1,N-1}$)=($e_0, \ldots, e_{N-1}$) with $e_j=\overline{z_J-y_J}$ at a chain end, wherein said chain end comprises input $F_{L-1}^{(P)}$; for an $i^{th}$ neuron, wherein the propagate function comprises ($e_{i,0}, \ldots, e_{i,m_i-1}$)=propagate ($e_{i+1,0}, \ldots, e_{i+1,m_{i+1}-1}$);

a processing of an update function, implemented and executed in an update logic sub-block ($F_i^{(U)}$), in order to calculate corrective parameters $\delta\theta_i$ to be applied to a current value of an internally stored parameter $\theta_i$ from the errors ($e_{i+1,0}, \ldots, e_{i+1,m_{i+1}-1}$) returned by the block $F_{i+1}^{(P)}$;

wherein the update function comprises an equation of $\delta\theta_i$=update ($e_{i+1,0}, \ldots, e_{i+1,m_{i+1}-1}$).

9. The real-time method according to claim 8, wherein said each neuron ($F_i$) comprises at least one implementation and one execution of a sequence of elementary processings comprising a sub-block $F_i^{(N)}$ performs ($x_{i+1,0}, \ldots, x_{i+1,m_{i+1}-1}$)=next ($x_{i,0}, \ldots, x_{i,m_i-1}$), $X_{ij} \in K^{q_{ij}}$ where $q_{ij}$ is an integer and K is a real number space or a complex number space, a sub-block $F_i^{(P)}$ performs ($e_{i,0}, \ldots, e_{i,m_i-1}$)=propagate ($e_{i+1,0}, \ldots, e_{i+1,m_{i+1}-1}$), a sub-block performs $F_i^{((U))}$ performs $\delta\theta_i$=update ($e_{i+1,0}, \ldots, e_{i+1,m_{i+1}-1}$).

10. The real-time method according to claim 8, wherein as the samples input into a system are processed by different sub-blocks, arbitrarily initialized values of different $\theta_i$ converge on values making the blind demodulation effective.

11. The real-time method according to claim 7, wherein the addition of the nonlinearity to an output of the last block ($H_i^{(N)}$ of the network is implemented by a function comprising $z_j$=NL($y_j$), wherein $z_j$ is an outgoing signal from a decision-making device in the last block, $y_j$ is an equalized or demodulated sample, a decision block being defined by a comparison of a result obtained by an output y of a phase block with a finite constellation of possible results stored by the decision block, and deciding to take, from the possible results, one for which a distance with a representative point of the output y is smallest.

12. The real-time method according to claim 7, wherein the back-propagation of the error signal is obtained by a processing, implemented and executed by an algorithm for the back-propagation of the error signal, said processing comprising initialization of the back-propagation comprising for $0 \le k < N, e_{L,k}=\overline{Z_k-y_k}$, propagation of an error by a sub-neuron $F_i^{(P)}$ in the comprising $e_{i,0}, \ldots, e_{i,m_i-1}$)=propagate($e_{i+1,0}, \ldots, e_{i+1,m_{i+1}-1}$) according to calculations comprising $$\forall\, 0 \le j < m_i,\ e_{i,j} = \sum_k e_{i+1,k} \cdot \frac{\partial F_{i,k}}{\partial x_{i,j}}.$$

13. The real-time method according to claim 12, wherein updating of the internal parameters $\theta_i$ of each neuron $F_i$ is obtained in the sub-neuron $F_i^{(U)}$ by the processing, implemented and executed in equation $\delta\theta_i$=update($e_{i+1,0}, \ldots, e_{i+1,m_{i+1}-1}$) according to calculation of $\Delta_i$:

$$\text{for, } 0 \le j < M_{i+1},\ D_{i,j} = e_{i+1,j} \cdot \frac{\partial F_{i,j}^{(N)}}{\partial \theta_i},$$

$\Delta_i=\Sigma_j D_{i,j}$;

updating of $\theta_i$:

$\theta_i+2\mu R(\Delta_i)$ if $\theta_i$ is in a Rvector space, $\theta_i+=2\mu\Delta_i$ if $\theta_i$ is in a Cvector space;

wherein $\mu_i$ is a real parameter called learning speed;

$\delta\theta_i$ is a corrective parameter of the internal parameters $\theta_i$, $D_{ij}$ is an intermediate quantity of auxiliary calculations that are temporarily stored.

14. The real-time method according to claim 7, wherein specialized neurons constitutes a sequence of multi inputs multi outputs (MIMO) blocks.

15. The real-time method according to claim 7, further comprising storage, by at least one buffer memory, of a plurality of inputs and in at least one other buffer of the plurality of outputs of each specialized neuron of the specialized neurons.

16. A computer program product implemented on a memory medium, executed within a computing processing unit and comprising instructions for implementing a real-time method of separation and blind demodulation of digital telecommunication signals, based on an observation of a sampled version of a signal and comprising internal parameters, comprising equalization coefficients, a value of a phase (φ), an amplitude of the signal, and frequency and symbol time of the internal parameters, wherein real-time method comprises:

acquisition, by a sampling, of a first plurality of the signal in order to each constitute an input of a network of processing blocks ($G_j$, $F_j$, $H_j$) comprising specialized neurons, each neuron of the specialized neurons being simulated by outputs of a preceding block of the processing blocks, the first plurality of the signal being input into a first block of the processing blocks simulating a first neuron of the network in order to generate a plurality of outputs of the first block;

wherein each neuron $F_j$ of the specialized neurons is simulated by outputs of an upstream chain $G_j$ and stimulating a downstream chain $H_j$;

wherein each set of samples passes through a same processing chain;

outputs of last block of the network of processing blocks correspond to demodulated symbols;

addition of a nonlinearity to each of the outputs of the last block of the network to calculate an error signal and propagation of the error signal in a reverse direction of a processing chain as back-propagation;

estimation, upon receipt of the error signal by each neuron (i) of the specialized neurons, of a corrective term $\delta\theta_i$ and updating, in each block of the network of processing blocks, of a value of a parameter $\theta_i$, according to $\theta_i+=\delta\theta_i$.

17. The computer program product according to claim 16, comprising hardware or a combination of said hardware and firmware, and coded instructions for implementing the real-time method.

18. Use in a system for blind demodulation of a telecommunication signal, the system comprising at least one network of specialized neurons each respectively defining a filtering by a first specialized neuron, an amplification gain by a second specialized neuron, a frequency of the telecommunication signal by a third specialized neuron and a phase value of the telecommunication signal by a fourth specialized neuron; wherein a real-time method is executed in order to determine characteristics of the telecommunication signal that is transmitted blindly; the real-time method comprising acquisition, by a sampling, of a first plurality of the telecommunication signal in order to each constitute an input of a network of processing blocks ($G_j$, $F_j$, $H_j$) comprising specialized neurons, each neuron of the specialized neurons being simulated by outputs of a preceding block of the processing blocks, the first plurality of the telecommunication signal being input into a first block of the processing blocks simulating a first neuron of the network in order to generate a plurality of outputs of the first block;

wherein each neuron $F_i$ of the specialized neurons is simulated by outputs of an upstream chain $G_j$ and stimulating a downstream chain $H_j$;

wherein each set of samples passes through a same processing chain;

outputs of last block of the network of processing blocks correspond to demodulated symbols;

addition of a nonlinearity to each of the outputs of the last block of the network to calculate an error signal and propagation of the error signal in a reverse direction of a processing chain as back-propagation;

estimation, upon receipt of the error signal by each neuron (i) of the specialized neurons, of a corrective term $\delta\theta_i$ and updating, in each block of the network of processing blocks, of a value of a parameter $\theta_i$ according to $\theta_i$+=$\delta\theta_i$.

19. A system for demodulating or blind searching characteristics of digital telecommunication signals, based on an observation by sampling of a signal comprising parameters $\theta_i$ comprising equalization coefficients, a value of a phase ($\varphi$), an amplitude of the signal, frequency and symbol time of the parameters $\theta_i$, wherein system comprises:

at least one hardware architecture or hardware and firmware comprising memories and one or more processing units for implementing a network of specific computation blocks connected to each other, of which a first specialized block of the network of specific computation blocks performs an estimation of at least one filter for blind signal acquisition, and a second block of the network of specific computation blocks that implements at least one module that estimates an amplification of signals that are observed in order to subsequently evaluate other characteristics of the signals that are observed by other computation blocks of the network of specific computation blocks, at least a third specialized computation block of the network of specific computation blocks that implements a decision module to calculate an error signal and back-propagate the error signal to each previous residual block of said specific computation blocks;

a specialized additional block connected to outputs of the second block and to inputs of the decision module, wherein specialized additional block implements at least one frequency estimation module for determining frequencies of blind signals transmitted and/or at least one phase module for determining phase values of said blind signals transmitted, wherein at least one phase module is arranged in an additional computation block connected to outputs of the at least one frequency estimation module of the specialized additional block, and wherein each of the one or more processing units of at least one of two channels receives each of two input signals ($x^h{}_0$, $x^v{}_0$) representing respectively a sampling of each channel of the two channels, to generate output signals $x^v{}_1$ and $x^h{}_1$, wherein signals $x_3{}^h$ and $x_3{}^v$ being representative of a correction applied to each signal $x_0$ by respective output signals $x_2{}^v$, $x_2{}^h$, of each filter of the at least one filter of each channel of said two channels, each emulated by a processing block N2 of the one or more processing units, the signals $x_3{}^h$ and $x_3{}^v$ are sent to serial cascades of processing blocks N3, N4 and N5 of each channel, each emulating the signal indicating the amplification of a channel for block N3, respectively a frequency of a channel for block N4 and respectively the phase ($\varphi$) of a channel for block N5.

* * * * *